US011218456B2

(12) United States Patent
Nakagawa

(10) Patent No.: US 11,218,456 B2
(45) Date of Patent: Jan. 4, 2022

(54) VEHICLE-ORIENTED SERVICE PROVIDING SYSTEM, IN-VEHICLE DEVICE, AND COMMAND TRANSMISSION METHOD

(71) Applicant: Toyota Jidosha Kabushiki Kaisha, Toyota (JP)

(72) Inventor: Masashi Nakagawa, Toyota (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 184 days.

(21) Appl. No.: 16/385,459

(22) Filed: Apr. 16, 2019

(65) Prior Publication Data
US 2019/0327212 A1    Oct. 24, 2019

(30) Foreign Application Priority Data
Apr. 18, 2018    (JP) .............................. JP2018-079609

(51) Int. Cl.
H04L 29/06    (2006.01)
H04L 29/08    (2006.01)

(52) U.S. Cl.
CPC .......... H04L 63/0428 (2013.01); H04L 63/20 (2013.01); H04L 67/12 (2013.01); H04L 67/26 (2013.01)

(58) Field of Classification Search
CPC ...... H04L 63/0428; H04L 63/20; H04L 67/12
See application file for complete search history.

(56) References Cited

U.S. PATENT DOCUMENTS 6,367,016 B1 *  4/2002  Lambert ............. G06Q 20/341
                                                713/185
6,757,283 B1 *  6/2004  Yamanaka ............. H04L 29/06
                                                370/390

(Continued)

FOREIGN PATENT DOCUMENTS

CN    107026840 A     8/2017
CN    107483393 A    12/2017

(Continued)

OTHER PUBLICATIONS

Younis, M., Farrag, O., Lee, S. and D'Amico, W. (2011), Optimized packet formation in multi-level security wireless data acquisition networks. Security Comm. Networks, 4: 1420-1439 (Year: 2011).*

(Continued)

Primary Examiner — Carl G Colin
Assistant Examiner — Zhe Liu
(74) Attorney, Agent, or Firm — Dinsmore & Shohl LLP

(57) ABSTRACT

A vehicle-oriented service providing system includes an in-vehicle device and configured to receive commands applied to a control device inside the vehicle, a vehicle information server configured to transmit the commands to the in-vehicle device, and a push information server configured to mediate the transmission of the commands from the vehicle information server to the in-vehicle device. In the commands, a security level prescribed in advance for each of the commands is set. The vehicle information server performs encryption corresponding to the security level on the commands, and requests the push information server for transmission. The in-vehicle device is configured to wait for commands from the push information server. The in-vehicle device is configured to decrypt the received encrypted commands, and solely when encryption corresponding to a security level equal to or higher than the security level set in (Continued)

advance in the commands is performed, execute the commands.

8 Claims, 7 Drawing Sheets

(56) References Cited

U.S. PATENT DOCUMENTS

| | | | | |
|---|---|---|---|---|
| 10,325,592 | B2* | 6/2019 | Talwar | G01C 21/3608 |
| 2002/0016858 | A1* | 2/2002 | Sawada | H04L 61/10 |
| | | | | 709/238 |
| 2007/0192830 | A1* | 8/2007 | O'Connor | H04L 9/32 |
| | | | | 726/2 |
| 2008/0127322 | A1* | 5/2008 | McCall | H04L 41/046 |
| | | | | 726/11 |
| 2009/0059878 | A1* | 3/2009 | Tamura | H04L 63/205 |
| | | | | 370/338 |
| 2009/0300595 | A1* | 12/2009 | Moran | G06F 8/65 |
| | | | | 717/170 |
| 2016/0117266 | A1* | 4/2016 | Anderson | G06F 12/1433 |
| | | | | 726/27 |
| 2016/0139594 | A1* | 5/2016 | Okumura | B60W 30/00 |
| | | | | 701/2 |
| 2016/0173530 | A1 | 6/2016 | Miyake | |
| 2016/0303973 | A1* | 10/2016 | Matsumoto | H04N 21/4532 |
| 2017/0060559 | A1* | 3/2017 | Ye | H04L 67/12 |
| 2017/0150361 | A1 | 5/2017 | Paryani et al. | |
| 2018/0011703 | A1* | 1/2018 | Planche | B61L 15/0027 |
| 2018/0219943 | A1* | 8/2018 | Gummig | H04L 67/104 |
| 2018/0336260 | A1* | 11/2018 | Furuichi | G06F 16/275 |
| 2019/0215376 | A1* | 7/2019 | Kang | H04L 61/6022 |
| 2019/0230206 | A1* | 7/2019 | Halash | H04M 1/6075 |
| 2020/0259655 | A1* | 8/2020 | Woo | H04L 12/66 |

FOREIGN PATENT DOCUMENTS

| | | |
|---|---|---|
| JP | 2007-015503 A | 1/2007 |
| JP | 2008-510205 A | 4/2008 |
| JP | 2013-168865 A | 8/2013 |
| JP | 2017-004116 A | 1/2017 |
| WO | 2007/077634 A1 | 7/2007 |

OTHER PUBLICATIONS

Ikawa, et al. "DSRC local communication platform and its application to information push service." 2004. IEEE Intelligent Vehicles Symposium, pp. 105-110 (Year: 2004).*

* cited by examiner

FIG. 4

| PUSH COMMAND CONFIGURATION | | CONTENT |
|---|---|---|
| COMMAND Ver. | | INDICATE VERSION OF COMMAND |
| TOTAL SECURITY LEVEL | | STORE HIGHEST LEVEL AMONG ALL COMMANDS |
| HASH | | HASH VALUE OF ALL OF SUBSEQUENT PAYLOADS |
| REFERENCE TIME | | COMMAND GENERATION TIME (Unitime) |
| NUMBER OF COMMANDS | | TOTAL NUMBER OF COMMANDS (FOLLOWING ARE REPEATED FOR EACH COMMAND) |
| | TTL (Time to Live) | VALID TIME OF COMMAND FROM REFERENCE TIME |
| | FUNCTION CLASSIFICATION | DESIGNATE FUNCTION TO BE EXECUTED BY COMMAND |
| | SECURITY LEVEL | SECURITY LEVEL OF COMMAND |
| | COMMAND LENGTH | LENGTH OF COMMAND |
| | COMMAND HASH | CRC-32 HASH VALUE OF COMMAND PAYLOAD |
| | COMMAND PAYLOAD | PRESCRIBE SPECIFIC OPERATION OF COMMAND (TRANSFER TO FUNCTION EXECUTION UNIT WITHOUT CHANGE) |

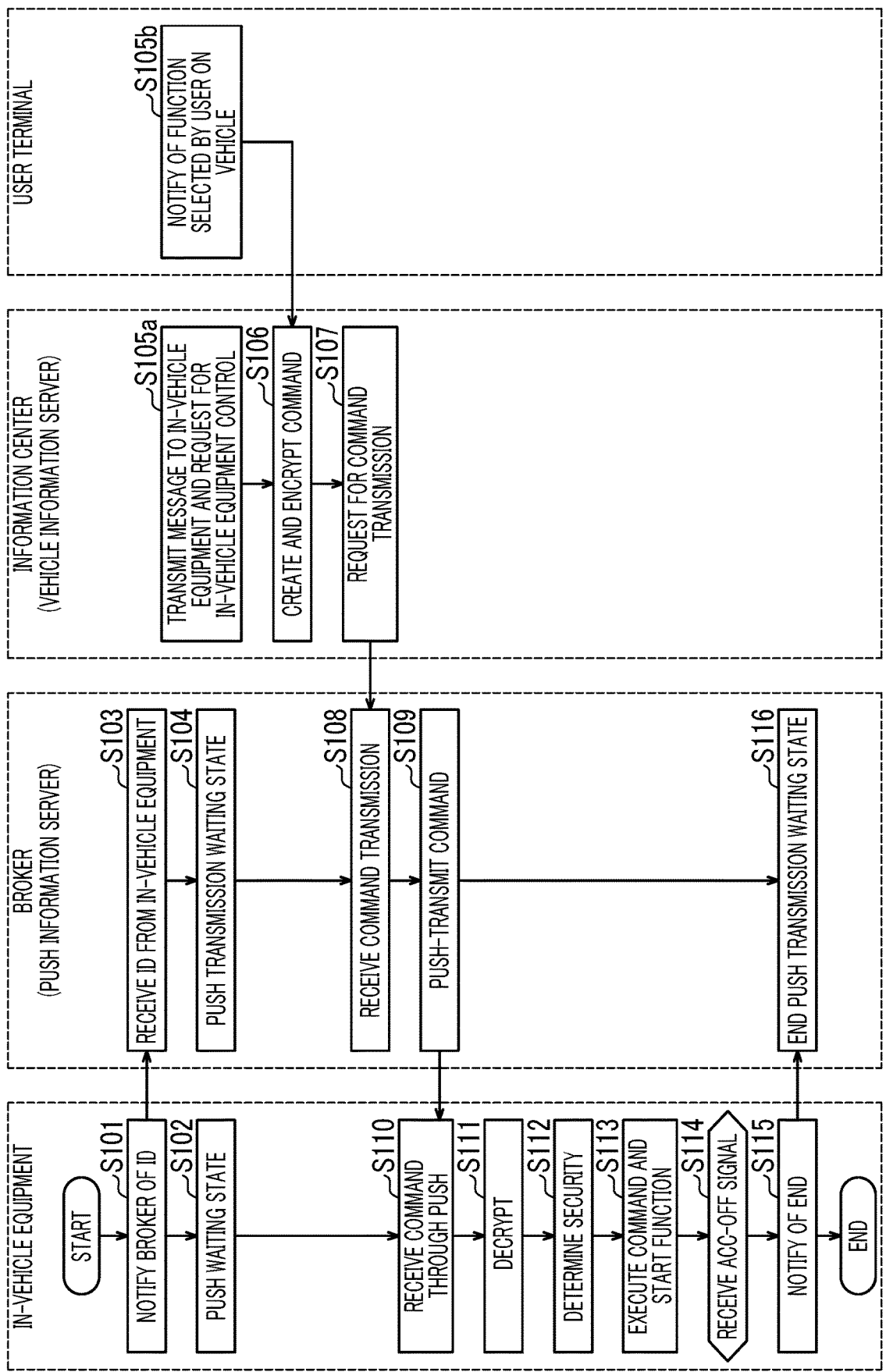

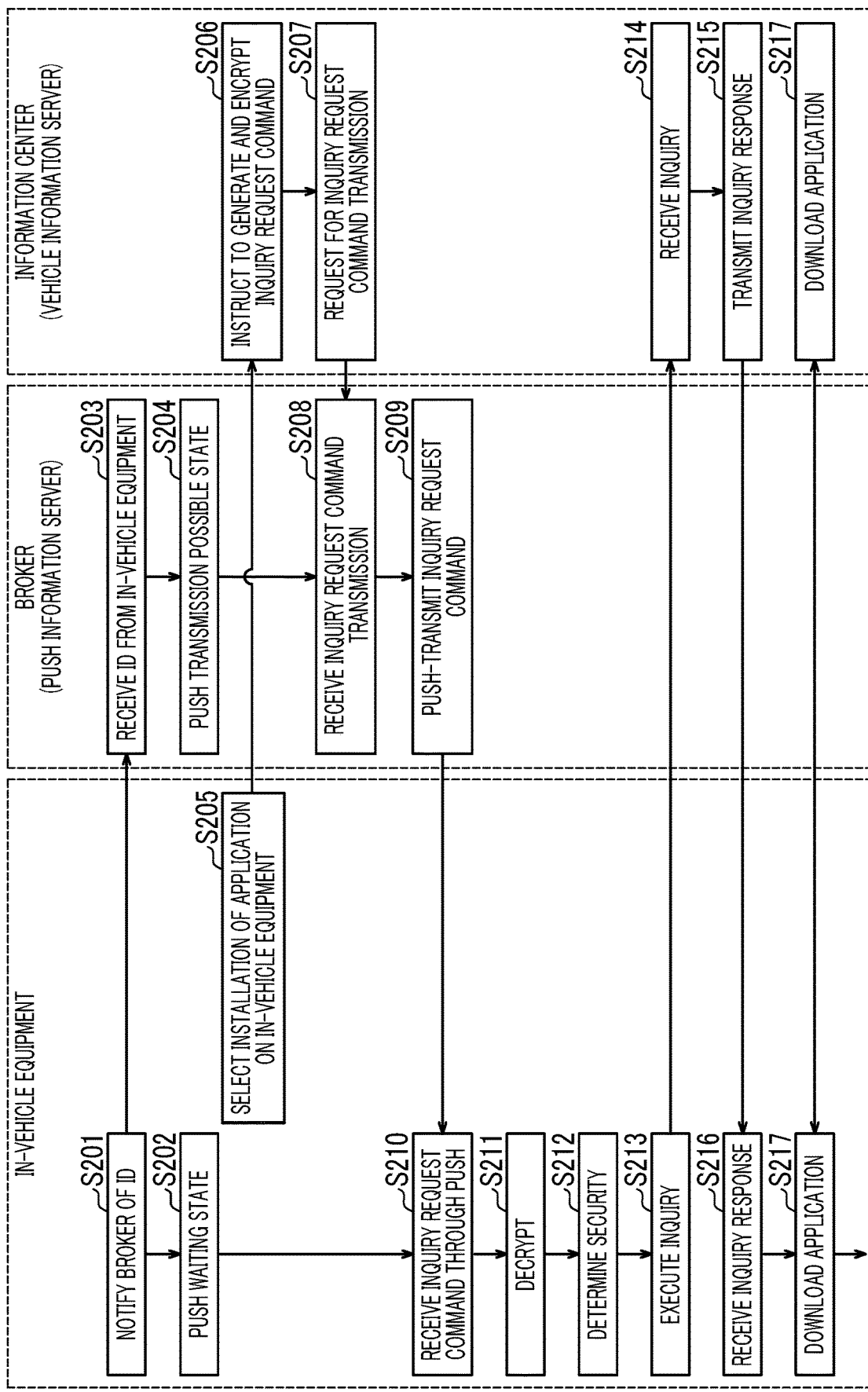

VEHICLE-ORIENTED SERVICE PROVIDING SYSTEM, IN-VEHICLE DEVICE, AND COMMAND TRANSMISSION METHOD

CROSS-REFERENCE TO RELATED APPLICATIONS

This application claims priority to Japanese Patent Application No. 2018-079609 filed on Apr. 18, 2018, which is incorporated herein by reference in its entirety including the specification, drawings and abstract.

BACKGROUND

1. Technical Field

The present disclosure relates to a vehicle-oriented service providing system, an in-vehicle device, and a command transmission method.

2. Description of Related Art

A system that provides a service between a vehicle and an information center through a network using an in-vehicle device has been suggested. As the service to be provided by such a system, remote control of a vehicle including a vehicle operation, such as door locking from a remote location, and confirmation of a vehicle state, such as a remaining fuel amount, is included.

For example, Japanese Unexamined Patent Application Publication No. 2007-015503 (JP 2007-015503 A) discloses an information providing system that provides information to an in-vehicle device in order to provide a common service to different vehicles. In the information providing system, a communication station that holds control information relating to the operation of the in-vehicle device different for each vehicle type of the vehicle mounted with the in-vehicle device is provided. The in-vehicle device of JP 2007-015503 A transmits an ID of the in-vehicle device and the vehicle type of the vehicle mounted with the in-vehicle device to the communication station and registers the ID of the in-vehicle device and the vehicle type of the vehicle in the communication station. The communication station transmits the control information according to the vehicle type received from the in-vehicle device to the in-vehicle device in response to a request from the in-vehicle device.

In the related art, various suggestions for securing security of a control device or the like inside a vehicle connected to a network have been made.

For example, Japanese Unexamined Patent Application Publication (Translation of PCT Application) No. 2008-510205 (JP 2008-510205 A) discloses an access method that is not limited to applications for a vehicle, and secures safety when there is equipment (client) that is about to access a computer (incorporated equipment) incorporated in a device through a computer network. According to JP 2008-510205 A, the client accesses the incorporated equipment through a security broker. A trust manager is provided on a network, and the trust manager determines validity of the client and the security broker and whether or not connection between the client and the security broker is permitted, and then, establishes the connection between the client and the security broker.

Japanese Unexamined Patent Application Publication No. 2013-168865 (JP 2013-168865 A) discloses an in-vehicle network system that deals with a risk of an attack on an in-vehicle network due to connection of an unauthorized in-vehicle electronic control unit (ECU) to the in-vehicle network. In the in-vehicle network system, a communication protocol issuance device is provided, and definition data in which a vehicle-specific protocol concealed from the outside of the vehicle is defined is distributed from the communication protocol issuance device to each ECU. The communication protocol issuance device broadcasts a simultaneous operation request related to definition data distributed to all ECUs, determines that an ECU not conforming to the simultaneous operation request is likely to be an unauthorized ECU, and issues a warning.

Japanese Unexamined Patent Application Publication No. 2017-004116 (JP 2017-004116 A) relates to a vehicle remote assistance system in which a center positioned remote from a vehicle performs assistance to allow an occupant of the vehicle to ascertain a vehicle state and to operate in-vehicle equipment. In JP 2017-004116 A, determination is made that there is a problem in security with automatic transmission of information from the vehicle to the center according to a request from the center, and when an agreement operation of an occupant of the vehicle is not made, a remote operation of the vehicle is inhibited from the information center.

SUMMARY

In a system in which a message is transmitted from a remote location to a vehicle or a control device of a vehicle can be operated from the remote location, it is desirable to be able to send a message or an operation command from an information center at the remote location at any timing. For example, when the information center informs the in-vehicle device of destination change, it is desirable that such information is transferred to the vehicle at a timing at which information is generated. In contrast, in the information providing system of JP 2007-015503 A, when a vehicle user requests the information center for a remote operation, the information center transmits an operation command to the vehicle. Accordingly, in the information providing system of JP 2007-015503 A, it is not possible to transmit a message from the information center side at any timing. Even in the system and the method disclosed in JP 2008-510205 A, JP 2013-168865 A, and JP 2017-004116 A, there is no disclosure that information is transmitted from the outside, such as the information center, to the in-vehicle device at any timing.

It is assumed that a device that performs an operation from the remote location to the vehicle performs an operation related to a control device inside the vehicle, such as changing a destination registered in a navigation device of the vehicle, changing a temperature setting of an air conditioning device of the vehicle, and updating an application of the in-vehicle device. In such a case, an unauthorized operation of the control device of the vehicle with reception of an unauthorized command from an external unauthorized third party is not acceptable.

Nowadays, various kinds of information can be freely acquired from the outside through a network, such as the Internet. Even inside a vehicle, a user wants to connect the Internet to acquire information of a destination, to search for information of a nearby restaurant, or the like. Note that it is not acceptable for reception of unauthorized information transmission from the outside to the in-vehicle device through the network to affect the control device of the vehicle when the in-vehicle device is made to be connectable to the Internet.

JP 2007-015503 A does not disclose a method of securing security of such communication. In the access method described in JP 2008-510205 A, when connection between the external equipment and the incorporated equipment is permitted once, subsequent access of the external equipment to the incorporated equipment is acceptable. For this reason, it is not possible to set security according to the content of the control information received from the external equipment. The in-vehicle network system described in JP 2013-168865 A is intended to secure security of communication between the ECUs inside the vehicle. For this reason, it is not possible to deal with an unauthorized control command from an external network. In the vehicle remote assistance system of JP 2017-004116 A, since the occupant of the vehicle determines the agreement of access from the information center, when many commands are transmitted from the center to the in-vehicle device, there is a possibility that an operation of the occupant becomes complicated.

The disclosure provides a vehicle-oriented service providing system, an in-vehicle device, and a command transmission method capable of transmitting a command to a vehicle at any timing and executing each command while securing security according to the command on the vehicle side.

A first aspect of the disclosure relates to a vehicle-oriented service providing system. The vehicle-oriented service providing system includes an in-vehicle device, a vehicle information server, and a push information server. The in-vehicle device is mounted in a vehicle and is configured to receive commands that are applied to a control device inside the vehicle. The vehicle information server is configured to transmit the commands to the in-vehicle device. The push information server is configured to mediate the transmission of the commands from the vehicle information server to the in-vehicle device. The in-vehicle device, the vehicle information server, and the push information server are connected to a communication network. In the commands, a security level prescribed in advance for each of the commands is set. The vehicle information server is configured to perform encryption corresponding to the security level on the commands and request the push information server for transmission of the encrypted commands. The in-vehicle device is configured to wait for commands from the push information server so as to receive the encrypted commands solely from the push information server. The in-vehicle device is configured to receive the encrypted commands from the vehicle information server by way of the push information server and decrypt the received encrypted commands. The in-vehicle device is configured to, solely when encryption corresponding to a security level equal to or higher than the security level set in advance in the commands is performed, execute the commands.

In the vehicle-oriented service providing system according to the first aspect, the vehicle information server may be configured to generate the commands based on a predetermined condition without receiving a request from the in-vehicle device and transmit the commands to the in-vehicle device.

In the vehicle-oriented service providing system according to the first aspect, the in-vehicle device may include a first processing unit and a second processing unit. The first processing unit may be configured to perform the reception, the decryption, and the execution of the commands. The second processing unit may be configured to perform solely communication that is not applied to the control device inside the vehicle with the vehicle information server or another server.

In the vehicle-oriented service providing system according to the first aspect, the security level may be divided into two or more levels.

In the vehicle-oriented service providing system according to the first aspect, the in-vehicle device may be configured to transmit a request that is applied to the control device inside the vehicle to the vehicle information server. The vehicle information server may be configured to, when the request is received from the in-vehicle device, transmit the command corresponding to the request to the in-vehicle device.

The vehicle-oriented service providing system according to the first aspect may further include a portable terminal. The portable terminal may be configured to transmit a request that is applied to the control device inside the vehicle to the vehicle information server. The vehicle information server may be configured to, when the request is received from the in-vehicle device, transmit the command corresponding to the request to the in-vehicle device.

In the vehicle-oriented service providing system according to the first aspect, the vehicle information server may be configured to transmit a plurality of the commands as one transmission unit to the in-vehicle device and perform encryption corresponding to a security level of a command having a highest security level among the commands included in the transmission unit on the transmission unit.

A second aspect of the disclosure relates to an in-vehicle device mounted in a vehicle. The in-vehicle device includes a first processing unit. The first processing unit is configured to receive commands that are generated by an external vehicle information server, are applied to a control device inside the vehicle, and are subjected to encryption corresponding to a security level. In the commands, the security level is prescribed in advance for each of the commands. The first processing unit includes a push waiting unit, a decryption unit, a security determination unit, and a command execution unit. The push waiting unit is configured to wait for commands from a push information server connected through a communication network and receive the encrypted commands from the vehicle information server by way of the push information server.

The decryption unit is configured to decrypt the received encrypted commands. The security determination unit is configured to, solely when encryption corresponding to a security level equal to or higher than the security level set in advance in the commands is performed, determine that the commands are executable. The command execution unit is configured to execute the commands determined to be executable. The first processing unit is configured to receive the encrypted commands solely from the push information server.

The in-vehicle device according to the second aspect of the disclosure may further include a second processing unit. The second processing unit may be configured to perform solely communication that is not applied to a control device inside the vehicle with the vehicle information server or another server.

A third aspect of the disclosure relates to a command transmission method that, in a vehicle-oriented service providing system including an in-vehicle device, a vehicle information server, and a push information server connected to a communication network, performs command transmission from the vehicle information server to the in-vehicle device. The command transmission method includes, with the in-vehicle device, waiting for reception of commands that are applied to a control device inside a vehicle from the push information server, with the vehicle information server, performing encryption corresponding to a security level prescribed in advance for each of the commands on the commands to be transmitted and requesting the push information server for transmission of the encrypted commands, with the push information server, transmitting the encrypted commands to the in-vehicle device, and with the in-vehicle device, decrypting the received encrypted commands, and solely when encryption corresponding to a security level equal to or higher than the security level set in advance in the commands is performed, executing the commands.

According to the aspects of the disclosure, it is possible to provide a vehicle-oriented service providing system, an in-vehicle device included in the vehicle-oriented service providing system, and a command transmission method capable of transmitting commands to a vehicle at any timing and executing each command while securing security according to the command on the vehicle side.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein:

FIG. 4 is a table showing an example of the configuration of a command;

FIG. 6 is a flowchart showing a flow of command transmission with an information center or a user terminal as a starting point; and FIG. 7 is a flowchart showing a flow of application installation with the in-vehicle equipment as a starting point.

DETAILED DESCRIPTION OF EMBODIMENTS

Figure 1:
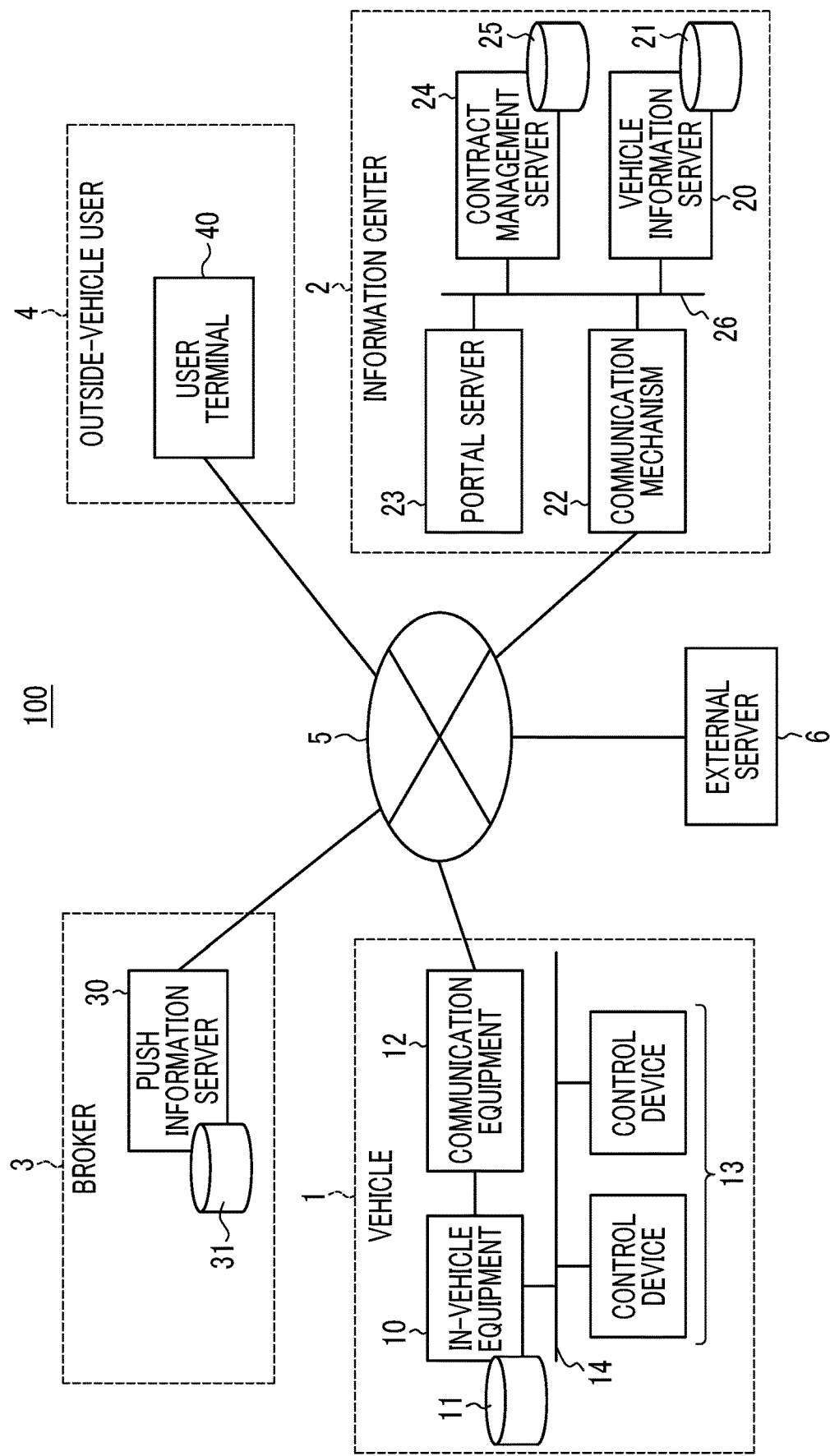
FIG. 1 is a block diagram showing the schematic configuration of a vehicle-oriented service providing system according to an embodiment.

Hereinafter, an embodiment of the disclosure will be described referring to the drawings.
Overall Configuration of Vehicle-Oriented Service Providing System A vehicle-oriented service providing system 100 of the disclosure will be described referring to FIG. 1. The vehicle-oriented service providing system 100 includes in-vehicle equipment 10 (in-vehicle device), a vehicle information server 20, and a push information server 30. The in-vehicle equipment 10 is mounted in a vehicle 1. The vehicle information server 20 can be disposed in the information center 2. The push information server 30 can be disposed in a center, called a broker 3. The push information server 30 may be disposed in the information center 2 like the vehicle information server 20.

The vehicle 1, the information center 2, and the broker 3 have a first storage unit 11, a second storage unit 21, and a third storage unit 31, respectively. Each of the first storage unit 11, the second storage unit 21, and the third storage unit 31 includes a semiconductor storage device, a magnetic storage device, or an optical storage device. The semiconductor storage device includes a solid state drive (SSD) using a flash memory, or the like. The magnetic storage device includes a magnetic tape, a Floppy (Registered Trademark) disk, a hard disk, or the like, and a drive device thereof. The optical storage device includes, for example, a compact disc (CD), a digital versatile disc (DVD), a Blu-ray (Registered Trademark) disc, or the like and a drive device thereof. The first storage unit 11, the second storage unit 21, and the third storage unit 31 may be databases managed by a database management system. The databases include a relational database (RDB), an object-relational database (ORDB), a NoSQL database, such as a key-value type or a column store type, and the like. The first storage unit 11, the second storage unit 21, and the third storage unit 31 may be embedded in the in-vehicle equipment 10, the vehicle information server 20, and the push information server 30, respectively. The first storage unit 11, the second storage unit 21, and the third storage unit 31 may be databases mounted in hardware different from the in-vehicle equipment 10, the vehicle information server 20, and the push information server 30. Hereinafter, description will be provided as to a case where the first storage unit 11, the second storage unit 21, and the third storage unit 31 are embedded in the in-vehicle equipment 10, the vehicle information server 20, and the push information server 30, respectively.

The in-vehicle equipment 10, the vehicle information server 20, and the push information server 30 are connected through a communication network 5, such as the Internet. The communication network 5 is not limited to the Internet, and may be a closed network, a virtual private network (VPN), or the like.

The vehicle-oriented service providing system 100 can further include a user terminal 40 carried with an outside-vehicle user 4. Here, a user who is not on the vehicle 1 is referred to as the "outside-vehicle user 4". A user in a general sense including a user who is on the vehicle 1 is simply referred to as a "user". A driver who sets a driving destination using the user terminal 40 before driving is the outside-vehicle user 4. Various external servers 6, such as Internet sites, may be connected to the communication network 5. Hereinafter, each unit of the vehicle-oriented service providing system 100 will be described in detail.

The vehicle 1 includes communication equipment 12, a plurality of control devices 13, and an in-vehicle communication line 14 connecting the in-vehicle equipment 10 and each control device 13, in addition to the in-vehicle equipment 10. In the specification, the vehicle 1 includes a passenger vehicle, a truck, a bus, a large or small special vehicle, or the like, but is not limited thereto. The vehicle 1 includes various types of vehicles that are implemented in future. For example, the vehicle 1 includes an autonomous driving vehicle, an unmanned driving vehicle, an amphibious vehicle, an air-land use vehicle, or the like.

The in-vehicle equipment 10 is an in-vehicle information terminal that is capable of transmitting and receiving information to and from the outside through the communication equipment 12. The in-vehicle equipment 10 can be disposed at various places in a dashboard including any place inside a vehicle cabin and a luggage room. The in-vehicle equipment 10 may be distributed to and disposed at these places.

The in-vehicle equipment 10 can receive commands to be applied to the control devices 13 from the vehicle information server 20 of the information center 2 by way of the push information server 30 of the broker 3. In the specification, the term "apply" means an operation having some influence including the start and the control of the device. The in-vehicle equipment 10 manages data to be transmitted and received to and from the vehicle information server 20. The in-vehicle equipment 10 can acquire the states of the control devices 13 on the vehicle 1 and can operate the control devices 13. The in-vehicle equipment 10 may have a function of a web browser that acquires information from the external servers 6 connected to the communication network 5 using a protocol, such as Hypertext Transfer Protocol (HTTP) and Hypertext Transfer Protocol Secure (HTTPS). In the disclosure, the commands are not responses that are returned to requests from the in-vehicle equipment 10 side. The commands are instructions to the in-vehicle equipment 10 that are asynchronously issued from the vehicle information server 20 and are to request any operations of the in-vehicle equipment 10 receiving the commands.

The communication equipment 12 is wireless communication equipment that connects the in-vehicle equipment 10 to the communication network 5 in a wireless manner. In the example shown in FIG. 1, the communication equipment 12 is constituted separately from the in-vehicle equipment 10. The communication equipment 12 may be connected to the in-vehicle communication line 14. The communication equipment 12 may be integrated with the in-vehicle equipment 10. A method of connection from the in-vehicle equipment 10 to the communication network 5 includes methods using a 3rd generation mobile communication system (3G), a 4th generation mobile communication system (4G), such as long term evolution (LIE), a 5th generation mobile communication system (5G), Wi-Fi (Registered Trademark), worldwide interoperability for microwave access (WiMAX), dedicated short range communication (DSRC), and the like, but is not limited thereto. The communication equipment 12 executes protocol processing on a transmission signal to generate a baseband signal, and modulates the baseband signal to a high-frequency electric signal within a wireless communication frequency bandwidth. The communication equipment 12 demodulates the high-frequency electric signal received from the outside through an antenna to a baseband signal and executes protocol processing. The communication equipment 12 can use various modulation systems. The modulation systems may include various systems, such as amplitude shift keying (ASK), phase shift keying (PSK), frequency shift keying (FSK), quadrature amplitude modulation (QAM), and orthogonal frequency-division multiplexing (OFDM). The communication equipment 12 may include integrated circuits (ICs), such as a high-frequency integrated circuit (IC) and baseband large scale integration (LSI).

Each control device 13 is an electronic control unit that controls each piece of equipment on the vehicle 1. The equipment on the vehicle 1 includes an engine, a motor, a brake, a transmission, an electronic key, power windows, an air conditioner, lamps, mirrors, car audio equipment, a navigation system, a safety system including various sensors and a radar, and the like, but is not limited thereto. The electronic control units are connected to one another through the in-vehicle communication line 14, such as a controller area network (CAN) (Registered Trademark). Each control device 13 that is connected to the in-vehicle communication line 14 can have an internal key for authentication or encryption as a security countermeasure when an unauthorized frame is transmitted to the in-vehicle communication line 14, or the like. Each control device 13 can generate an encryption key for communication using the key.

The in-vehicle communication line 14 is a communication line that connects equipment, such as the control devices 13 inside the vehicle 1, at a high speed. The in-vehicle communication line 14 can be a CAN bus that connects nodes of the CAN, such as the electronic control units. The in-vehicle communication line 14 is not limited to the CAN, and can be a communication line, such as Local Interconnect Network (LIN), FlexRay (Registered Trademark), in-vehicle Ethernet (Registered Trademark), or Media Oriented System Transport (MOST). The in-vehicle communication line 14 is not limited to a bus type, and wiring having various topologies, such as a star type and a ring type, may be employed.

Configuration of In-Vehicle Equipment

Figure 2:
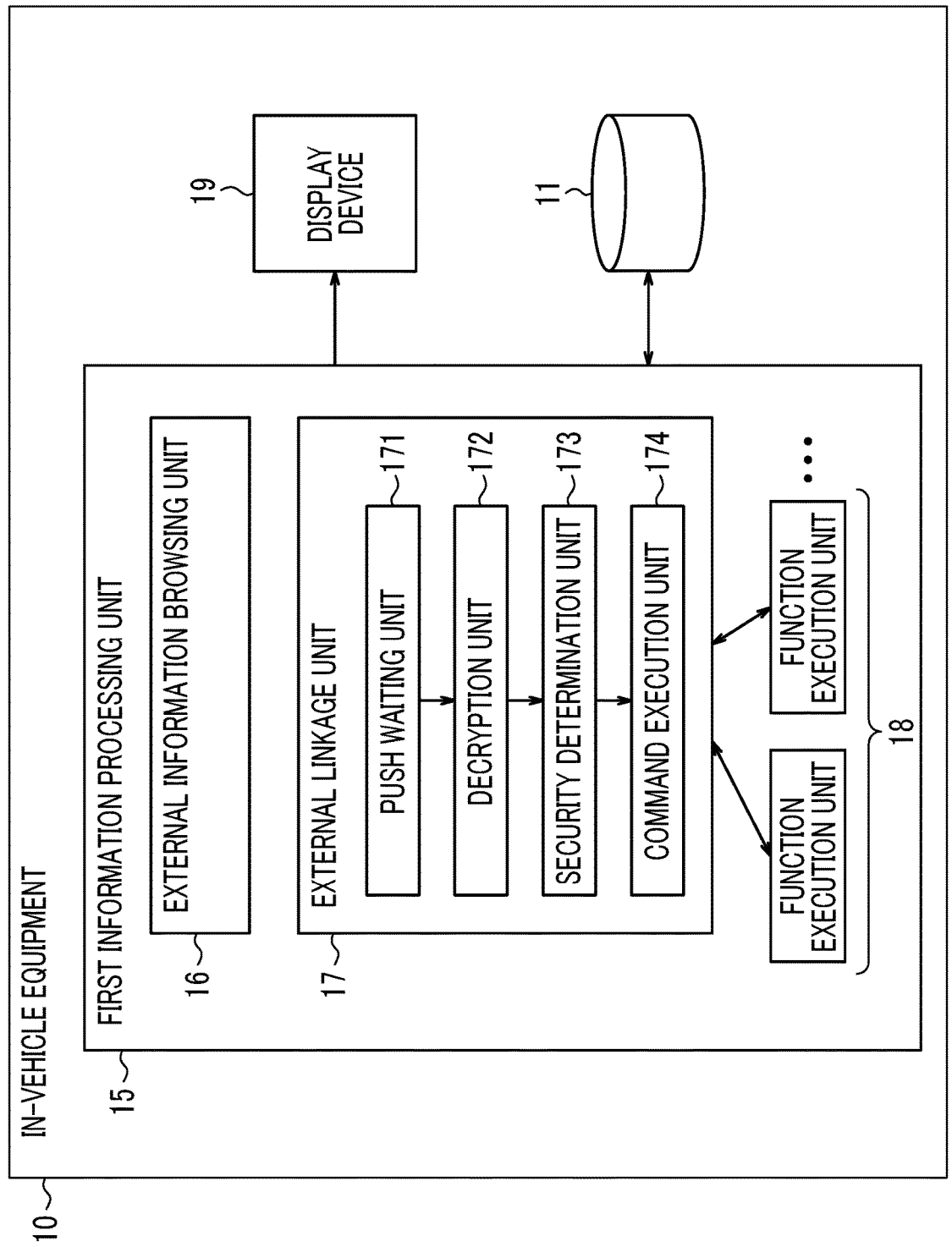
FIG. 2 is a block diagram showing the schematic configuration of in-vehicle equipment of FIG. 1.

The in-vehicle equipment 10 will be described referring to FIG. 2. The in-vehicle equipment 10 includes the first storage unit 11, a first information processing unit 15, and a display device 19.

The first storage unit 11 of the in-vehicle equipment 10 stores various kinds of information for the operation of the in-vehicle equipment 10, in particular, an external linkage unit 17 described below. The first storage unit 11 holds information of a vehicle ID of a host vehicle (vehicle 1) as an ID for communication, an ID of the information center 2, an ID of the broker 3, a plurality of encryption keys for communication, a security level prescribed in advance for each command, and the like.

The vehicle ID of the vehicle 1, the ID of the information center 2, and the ID of the broker 3 can be restated into an ID of the in-vehicle equipment 10, an ID of the vehicle information server 20, and an ID of the push information server 30, respectively.

The ID of the vehicle 1 can be allocated to the vehicle 1, for example, in manufacturing the vehicle 1, or the like. The ID of the information center 2 can be decided in advance in manufacturing the vehicle 1. Alternatively, the ID of the information center 2 may be acquired when the user of the vehicle I makes a contract with the information center 2. The ID of the broker 3 can be decided in advance in manufacturing the vehicle 1. The ID of the broker 3 may be acquired from the information center 2 when the user of the vehicle 1 makes a contract with the information center 2. Alternatively, the ID of the broker 3 may be acquired through access of the in-vehicle equipment 10 to the vehicle information server 20 at an appropriate timing before the user uses a service for the first time after making a contract with the information center 2. The broker 3 is the broker 3 that is made trustworthy by the information center 2.

The first information processing unit 15 includes functional blocks of an external information browsing unit 16 (second processing unit), the external linkage unit 17 (first processing unit), and one or more function execution units 18. The first information processing unit 15 includes a single processor or a plurality of processors and a memory. The processors include a general-purpose processor in which a specific program is loaded to execute a programmed function, and a dedicated processor specialized for specific processing. As the dedicated processor, a digital signal processor (DSP), an application specific integrated circuit (ASIC), and a field-programmable gate array (FPGA), and the like may be employed. The memory can store the program to be executed in the processor, information under calculation in the processor, and the like. The memory and the processors are connected by a bus line, such as a data bus and a control bus. The memory may include a read only memory (ROM), a random access memory (RAM), a flash memory, and the like. The RAM includes a dynamic random access memory (DRAM) and a static random access memory (SRAM).

The external information browsing unit 16 is connected to the external servers 6, such as an Internet site, through the communication network 5, and provides display and operation functions of the external servers 6 to the user. The external information browsing unit 16 corresponds to a protocol, such as HTTP and HTTPS, and acquires information from the external servers 6. Information acquired from the external server 6 can be displayed using the display device 19. The external information browsing unit 16 can be a web browser that is used for site browsing on the Internet.

The external information browsing unit 16 (second processing unit) is logically separated from other portions of the first information processing unit 15 by a known method. As the known method, separation of resources of a central processing unit (CPU) and the like through virtualization is included. The external information browsing unit 16 can be implemented on a virtual machine independent from other portions of the first information processing unit 15. The external information browsing unit 16 is not linked directly with the external linkage unit 17 and the function execution units 18 of the in-vehicle equipment 10. The external information browsing unit 16 performs solely communication to be not directly applied to the control devices 13 inside the vehicle I with the vehicle information server 20 or other external servers 6. That is, the external information browsing unit 16 operates as an independent terminal for Internet browsing. For this reason, even though unauthorized software is downloaded using the external information browsing unit 16 or even though the external information browsing unit 16 is under attack from the outside, other portions of the first information processing unit 15 are not affected. Accordingly, the user can freely browse information on the external server 6 while securing safety of the control devices 13.

The external linkage unit 17 (first processing unit) receives encrypted commands solely from the vehicle information server 20 through the push information server 30 of the broker 3. The external linkage unit 17 does not receive information from the outside other than the push information server 30. The commands that are transmitted from the vehicle information server 20 to the external linkage unit 17 are transmitted at any timing by a push system. That is, instead of a form in which the external linkage unit 17 transmits a request to the vehicle information server 20 and the vehicle information server 20 responds to the request, the commands to the external linkage unit 17 are transmitted asynchronously with the vehicle information server 20 as a starting point. In the disclosure, when information for transmission is generated, instead of a form of responding to a request from a reception side, a transmission form in which a transmission side transmits the generated information asynchronously is called "push transmission". The external linkage unit 17 decrypts the received commands, determines security, and when there is no problem, executes the commands. The commands are executed by delivering the contents of the commands to the function execution units 18 corresponding to the control devices 13.

The external linkage unit 17 includes functional blocks of a push waiting unit 171, a decryption unit 172, a security determination unit 173, and a command execution unit 174. The functional blocks constituting the external linkage unit 17 can be combined, separated, and rearranged. Processing to be executed by the functional blocks of the external linkage unit 17 can be restated into processing to be executed by the external linkage unit 17 or the in-vehicle equipment 10.

The push waiting unit 171 can transmit the vehicle ID as identification information of the vehicle 1 to the push information server 30 connected through the communication network 5, and can be brought into a push waiting state of waiting for the commands from the push information server 30. When the push waiting state is brought, the push waiting unit 171 can receive the encrypted commands from the vehicle information server 20 by way of the push information server 30. The push waiting unit 171 establishes a connection for performing safe communication with the push information server 30 and is brought into a waiting state. When the connection is established once, the push waiting unit 171 can intermittently receive a plurality of push transmission from the push information server 30 while maintaining the connection. When the in-vehicle equipment 10 ends the processing, the push waiting unit 171 releases the push waiting state and notifies the push information server 30 of the end of the push waiting state. The push waiting unit 171 may release the push waiting state with ACC power (accessory power) off of the vehicle 1 as a trigger.

As an implementation method of push transmission from the push information server 30 to the push waiting unit 171, a known method can be used. As the known method, for example, a technique similar to a server-sent event (SSE) of a web socket to be used between an HTTP server and a client may be employed. Alternatively, a pseudo push mechanism, such as long polling, may be used. In this case, the push waiting unit 171 transmits a request to the push information server 30, and the push information server 30 reserves a response until a transmission command is generated.

The commands to be transmitted from the vehicle information server 20 are subjected to encryption according to a security level prescribed in advance based on the type of the command. The decryption unit 172 decrypts the encrypted commands received by the push waiting unit 171. For this reason, the decryption unit 172 has an encryption key for communication for decrypting the command.

The security determination unit 173 performs authentication according to the security level. That is, the security determination unit 173 determines that the commands are executable solely when encryption corresponding to a security level equal to or higher than the security level prescribed in advance in the commands is performed.

The command execution unit 174 delivers the commands determined to be executable by the security determination unit 173 to the function execution units 18, and executes the functions of the function execution units 18.

The function execution units 18 perform the operations of the corresponding control devices 13 in response to the commands from the vehicle information server 20. Each of the function execution units 18 corresponds to one or a plurality of control devices 13. For example, the function execution unit 18 corresponding to the control device 13 of the navigation system receives a command for notifying of destination change from the vehicle information server 20 and informs the user of the destination change through display on a display screen of the navigation system or by voice. For example, the function execution unit 18 corresponding to the control device 13 that controls a seat receives a command for adjusting a front-rear position of the seat, an inclination, a seat surface height, strength of ventilation, or the like from the vehicle information server 20 and adjusts a position, a posture, or the like of the seat. Each function execution unit 18 has a unique command according to the corresponding control device 13.

The display device 19 is a display device that displays a display image based on an image signal from the first information processing unit 15. As the display device 19, for example, various displays, such as a liquid crystal display (LCD), an organic electro-luminescence (EL) display, an inorganic EL display, a plasma display panel (PDP), a field emission display (FED), an electrophoresis display, and a twist ball display, may be employed. A display surface of the display device 19 may be integrated with a touch panel for inputting information. The touch panel receives an input in conjunction with a display content of the display device 19. As the touch panel, various systems, such as an electrostatic capacitance system, a resistive film system, and a surface acoustic wave system, may be employed.

The encryption key is a key that is used in encryption for allowing the in-vehicle equipment 10 to perform communication with the vehicle information server 20. The vehicle information server 20 has a key corresponding to the encryption key of the in-vehicle equipment 10. The encryption key may be a common key when a common key encryption system is used, or may be a secret key when a public key encryption system is used. Information of a key unique to the vehicle 1 may be shared with the information center 2. The in-vehicle equipment 10 may generate the encryption key for communication based on the key of the control device 13. The information center 2 may acquire information of the key of the vehicle 1 in advance. Alternatively, exchange of the encryption key may be performed between the in-vehicle equipment 10 and the vehicle information server 20 using a method with safety secured. A plurality of encryption keys is prepared according to the security level. The encryption key may have a different key length according to the security level.

Configuration of Information Center

The information center 2 provides various services to the in-vehicle equipment 10 of the vehicle 1 from a remote location. The information center 2 can perform transmission and reception of data with the in-vehicle equipment 10. The services to be provided by the information center 2 include services accompanied with an operation to the control device 13 of the vehicle 1. When an operation to be applied to the control device 13 is performed to the in-vehicle equipment 10, the information center 2 transmits commands through the push information server 30 of the broker 3 with safety secured. The information center 2 includes the vehicle information server 20, a communication mechanism 22, a portal server 23, and a contract management server 24. The constituent elements of the information center 2 are connected through a local area network (LAN) 26 or the like.

The vehicle information server 20 manages the state of the vehicle 1 and transmits commands to the vehicle 1 in response to a request of the user of the in-vehicle equipment 10. The state of the vehicle 1 includes information of equipment in the vehicle 1, functions to be executable in the vehicle 1, installable applications, and the like. The state of the vehicle 1 includes information related to the services that are provided to the vehicle 1 by the vehicle information server 20. For example, when the vehicle information server 20 assists the navigation of the vehicle 1 in real time, information of a current location and a destination of the vehicle I is included in the state of the vehicle 1.

The communication mechanism 22 connects the communication network 5 and the LAN 26 to each other. The communication mechanism 22 is connected to the communication network 5 in a wired or wireless manner. When the communication mechanism 22 is connected to the network in a wired manner, the communication mechanism 22 includes communication equipment, such as an optical network unit (ONU), a digital service unit (DSU), a cable modem, or an ADSL modem, a router, and the like. When the communication mechanism 22 is connected to the network in a wireless manner, the communication mechanism 22 includes wireless communication equipment, an antenna, and the like. The communication mechanism 22 can receive a request from the vehicle 1 or the user terminal 40 through the communication network 5. The communication mechanism 22 can relay the transmission commands from the vehicle information server 20 to the push information server 30.

The portal server 23 integrates information from a back-end system, such as the vehicle information server 20 and the contract management server 24, and displays the integrated information to the user of the in-vehicle equipment 10 and the outside-vehicle user 4 of the user terminal 40. The portal server 23 can be accessed from the external information browsing unit 16 and the user terminal 40 through a protocol, such as HTTP and HTTPS, like a normal web site. The portal server 23 can perform request-response type information provision like a normal web site.

The portal server 23 also functions as a user interface that is provided when the user requests the in-vehicle equipment 10 for an operation to be applied to the control device 13. That is, the user of the in-vehicle equipment 10 and the outside-vehicle user 4 who operates the user terminal 40 can request the in-vehicle equipment 10 for an operation to start a specific function, to install a specific application, or the like using a user interface similar to a web site of the Internet. When an operation to be applied to the control device 13 is requested on a screen on the portal server 23, the portal server 23 delivers the operation request to a push request reception unit 271 described below of the vehicle information server 20.

The contract management server 24 manages a contract content of each contractor. The contractor is allocated with a user ID. The contract management server 24 manages the user ID and the vehicle ID in association with each other. For example, when the outside-vehicle user 4 is about to use a service of the vehicle information server 20 using the user terminal 40, the user ID is notified from the user terminal 40 to the vehicle information server 20. The vehicle information server 20 inquires the contract management server 24, thereby associating the user ID and the vehicle ID with each other.

The contract management server 24 provides information of usable functions on the contract basis, installable applications, and the like to the vehicle information server 20. For example, when the user of the in-vehicle equipment 10 selects installation of an application on the screen of the portal server 23, the vehicle information server 20 inquires the contract management server 24 about whether or not the user is able to use the application. When the application is not usable on the contract basis, the contract management server 24 notifies the vehicle information server 20 of the effect. The vehicle information server 20 performs display "This application is not installable" on the screen of the portal server 23.

The contract management server 24 includes a fourth storage unit 25 that manages contract information. The fourth storage unit 25 may be a database that manages contractor information. In information of each contractor, information of the user ID, the vehicle ID, authentication information, such as a password in using the user terminal 40, contractor personal information, a contract term, a contract content including usable functions and installable applications, and the like are stored.

Configuration of Vehicle Information Server

Figure 3:
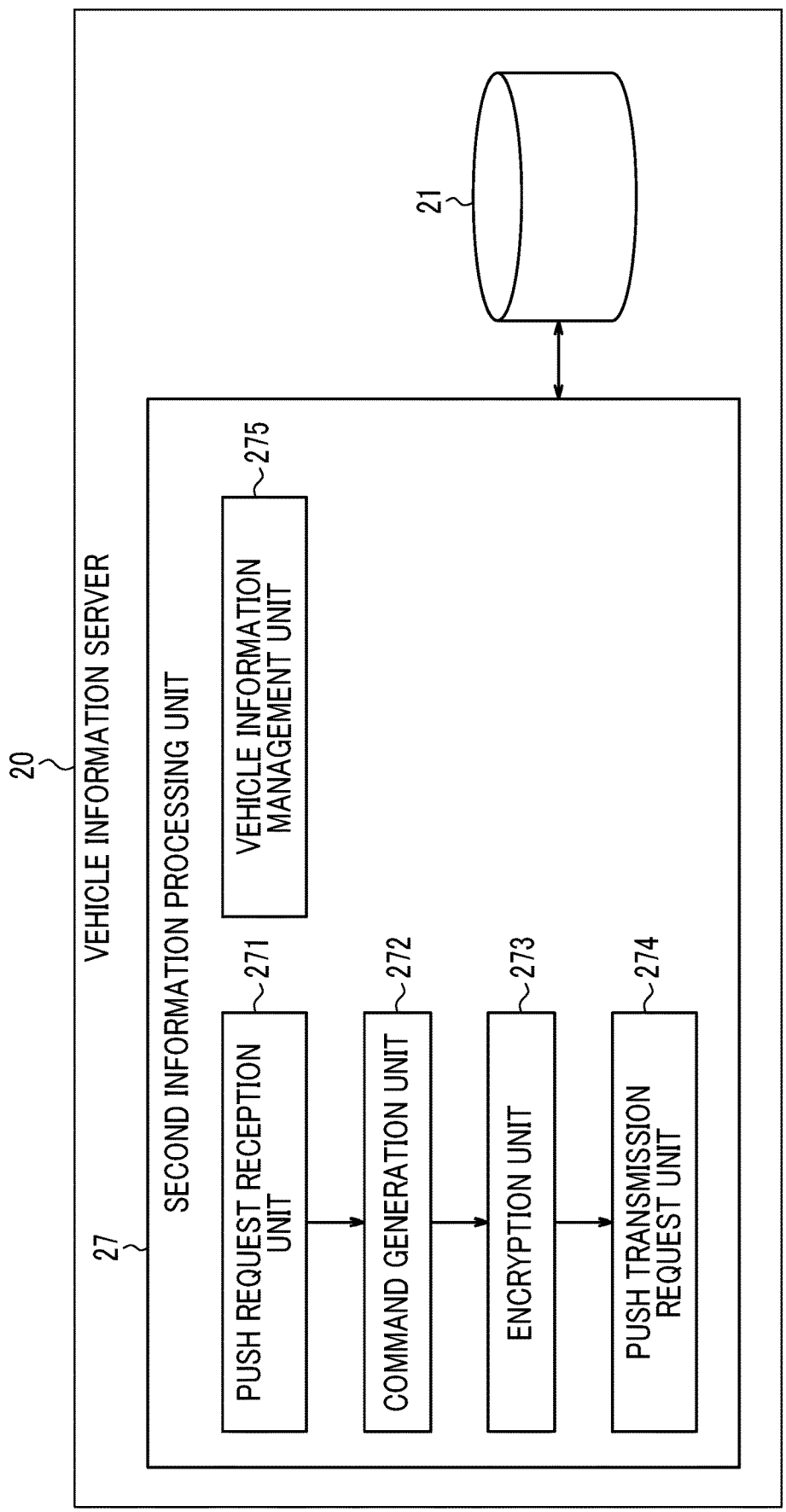
FIG. 3 is a block diagram showing the schematic configuration of a vehicle information server of FIG. 1.

Next, the vehicle information server 20 will be further described referring to FIG. 3.

The vehicle information server 20 includes the second storage unit 21 and a second information processing unit 27.

The second storage unit 21 of the vehicle information server 20 stores various kinds of information for the operation of the second information processing unit 27. The second storage unit 21 holds information of the vehicle ID of each vehicle 1 to be registered in the vehicle information server 20, the ID of the broker 3 to be used by each vehicle 1, a plurality of encryption keys for communication to be set in each vehicle 1, a security level prescribed for each command in advance, and the like. Information of the encryption key for communication is shared with each vehicle I. The encryption key may be a common key when a common key encryption system is used, or may be a public key to be provided from the in-vehicle equipment 10 when a public key encryption system is used.

The second storage unit 21 stores the state of each vehicle 1 that is registered in the vehicle information server 20. The state of the vehicle 1 includes information of a current location, a destination, held equipment, functions under execution, executable functions, mounted applications, and the like of each vehicle 1.

The second information processing unit 27 includes a single processor or a plurality of processors and a memory like the first information processing unit 15. The second information processing unit 27 includes functional blocks of a push request reception unit 271, a command generation unit 272, an encryption unit 273, a push transmission request unit 274, and a vehicle information management unit 275. The functional blocks constituting the second information processing unit 27 can be combined, separated, and rearranged. Processing to be executed by the functional blocks of the second information processing unit 27 can be restated into processing to be executed by the second information processing unit 27 or the vehicle information server 20.

The push request reception unit 271 receives requests, such as an operation request of the control device 13 of the in-vehicle equipment 10 and an inquiry request to the vehicle information server 20, from the portal server 23, the vehicle information management unit 275, the user terminal 40, and the like.

The command generation unit 272 can generate a command in response to the operation request of the control device 13. When a command is generated with a high frequency, for example, as shown in FIG. 4, a plurality of commands can be collected in one transmission unit. A command configuration of FIG. 4 is an example. The commands may be sequentially transmitted one by one. In FIG. 4, "security level" is a security level of an individual command, and "total security level" is the highest security level among a plurality of commands included in one transmission unit.

The security level of the command is set in advance for each command and is shared between the in-vehicle equipment 10 and the vehicle information server 20. The security level of the command is divided into two or more levels based on significance to the security of the vehicle 1. For example, the security level can be set in four stages of Lv0 to Lv3 in an ascending order of the security level. For example, Lv0 allows solely reading of information from the control device 13. For example, Lv1 allows solely a start operation of the control device 13. For example, Lv2 allows starting of a specific operation of the control device 13. For example, Lv3 allows operations including communication with other ECUs inside the vehicle 1. The security level can be set individually according to the type of the control device 13. For example, a command for operating the control device 13 related to braking of the vehicle 1 can be constantly set to the highest security level.

For example, in FIG. 4, when three commands are included in one transmission unit, "3" that is the number of commands included in one transmission unit is input to "number of commands" of FIG. 4. The constituent elements after time to live (TTL) are repeated for each command. When "security level" of the three commands are Lv0, Lv1, and Lv3, respectively, "total security level" becomes "Lv3" that is the highest level.

The command configuration of FIG. 4 includes a hash value "hash" for verifying that there is no alteration or breakage in the whole of one transmission unit. The command configuration of FIG. 4 includes "command hash" for verifying that there is no alteration or breakage in each command. "Command payload" is a body of a command to be delivered to each function execution unit 18.

The encryption unit 273 can perform encryption corresponding to the security level set in "total security level" on the commands generated by the command generation unit 272. For example, when the total security level is Lv0, encryption is not performed, and when the total security level is Lv1 to Lv3, encryption can be performed such that, when the total security level is higher, decryption is more hardly performed. For example, when the total security level is higher, encryption may use a longer encryption key.

The push transmission request unit 274 transmits the encrypted commands by the encryption unit 273 to the push information server 30 to request for push transmission. The push transmission request unit 274 transmits the ID of the vehicle information server 20 and the vehicle ID of the vehicle 1 as a transmission destination to the push information server 30 corresponding to the vehicle ID of the vehicle 1 along with the commands.

The vehicle information management unit 275 manages the state of each vehicle 1 registered in the vehicle information server 20. The vehicle information management unit 275 manages services that are registered in the vehicle information server 20 by the user. The vehicle information management unit 275 may request the push request reception unit 271 for an operation of the control device 13 of the in-vehicle equipment 10 under a predetermined condition in terms of information and the services to be managed by the vehicle information management unit 275. For example, a case where a user who uses the navigation system receives a service of avoiding congestion is assumed. The vehicle information management unit 275 can acquire congestion information from an external information source. When congestion occurs on a route to be guided by the navigation system mounted in the vehicle 1, the vehicle information management unit 275 may request the control device 13 of the navigation system for an operation for route change.

Configuration of Broker

Figure 5:
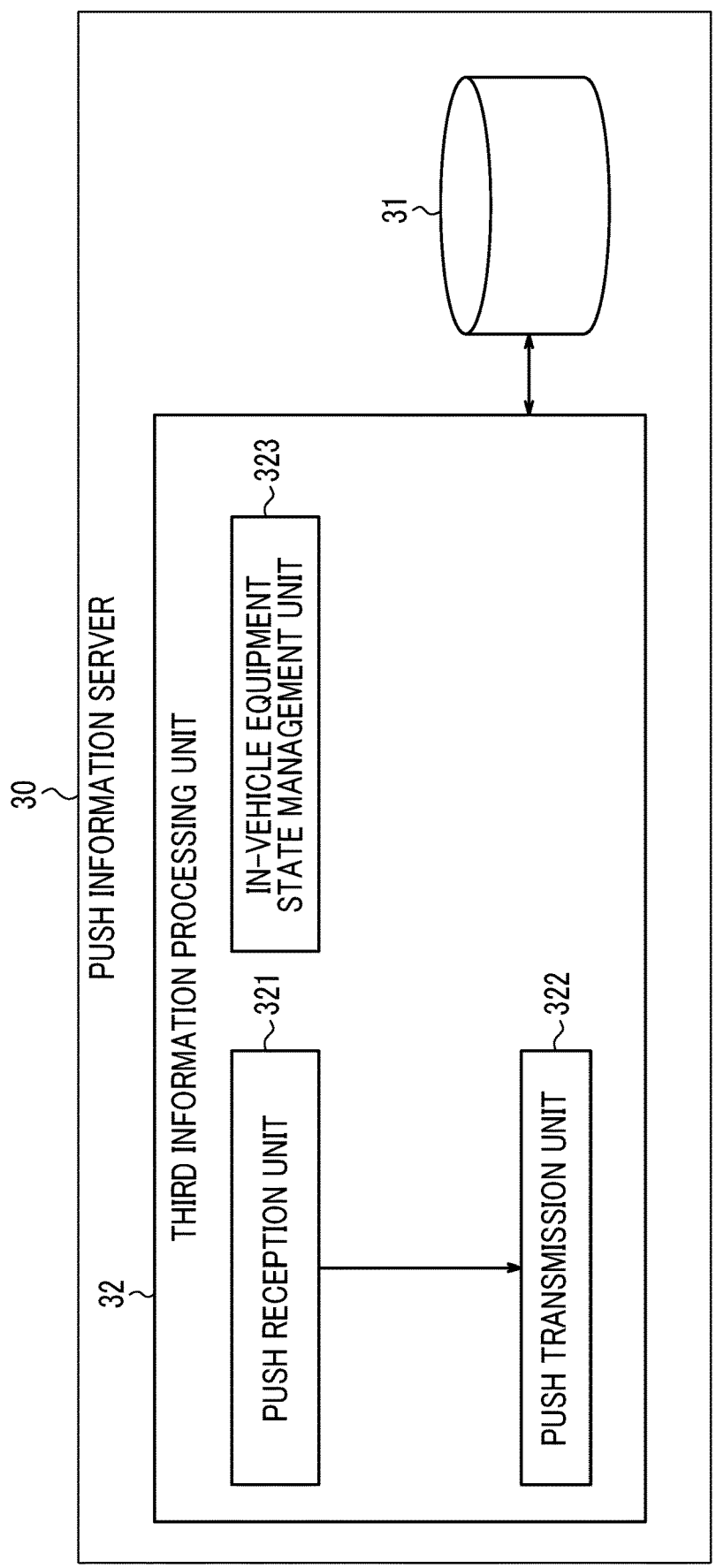
FIG. 5 is a block diagram showing the schematic configuration of a push information server of FIG. 1.

The broker 3 provides a push service of push-transmitting the commands delivered from the vehicle information server 20 of the information center 2 to the in-vehicle equipment 10 of the vehicle 1. The broker 3 includes the push information server 30. Hereinafter, the push information server 30 will be described referring to FIG. 5.

The push information server 30 mediates the transmission of the commands from the vehicle information server 20 to the in-vehicle equipment 10. The push information server 30 includes the third storage unit 31 and a third information processing unit 32.

The third storage unit 31 of the push information server 30 stores various kinds of information for the operation of the third information processing unit 32. The third storage unit 31 holds the vehicle ID of each vehicle 1 receiving push transmission, the ID of the vehicle information server 20 associated with the vehicle ID, and the state of the in-vehicle equipment 10 of each vehicle I. The state of the in-vehicle equipment 10 includes a push waiting state and a push reception disable state.

The third information processing unit 32 includes a single processor or a plurality of processors and a memory like the first information processing unit 15. The third information processing unit 32 includes functional blocks of a push reception unit 321, a push transmission unit 322, and an in-vehicle equipment state management unit 323. The functional blocks constituting the third information processing unit 32 can be combined, separated, and rearranged. Processing to be executed by the functional blocks of the third information processing unit 32 can be restated into processing to be executed by the third information processing unit 32 or the push information server 30.

The push reception unit 321 receives a transmission request of a command transmitted from the push transmission request unit 274 of the vehicle information server 20. The push reception unit 321 confirms the ID of the vehicle information server 20 that transmits the command, and when the transmission request of the command is transmitted from the registered vehicle information server 20, delivers the transmission request to the push transmission unit 322.

The in-vehicle equipment state management unit 323 manages the state of each in-vehicle equipment 10 that receives push transmission from the push information server 30, in cooperation with the third storage unit 31. As the state of the in-vehicle equipment 10, two states of a push waiting state and a push reception disable state are included. The push waiting state is a state in which connection for push transmission between the push waiting unit 171 of the in-vehicle equipment 10 and the push transmission unit 322 is established, and a command is receivable at any time. The push reception disable state is a state in which push transmission is not possible to the push waiting unit 171 of the in-vehicle equipment 10. The push reception disable state is a state in which connection for push transmission between the push waiting unit 171 of the in-vehicle equipment 10 and the push transmission unit 322 is not established, for example, when the ACC power of the vehicle 1 is off. The state of each vehicle 1 is stored in the third storage unit 31.

When the in-vehicle equipment 10 as the transmission destination of the command is in the push waiting state, the push transmission unit 322 push-transmits the command delivered from the push reception unit 321 to the push waiting unit 171 of the in-vehicle equipment 10. When the in-vehicle equipment 10 as the transmission destination of the command is in the push reception disable state, the push transmission unit 322 can temporarily store the command delivered from the push reception unit 321 in the third storage unit 31, and can wait until the in-vehicle equipment 10 is brought into the push waiting state. When the in-vehicle equipment 10 is not brought into the push waiting state after a predetermined time has elapsed, the push transmission unit 322 notifies the vehicle information server 20 of transmission failure due to overtime and may discard the command.

User Terminal

When information of the vehicle 1 is acquired using the user terminal 40, the outside-vehicle user 4 can transmit information to the vehicle 1, can operate a part of the functions of the vehicle 1 by remote control, or the like. For example, the outside-vehicle user 4 can access a service on the vehicle information server 20 using the user terminal 40 to set and change a movement schedule using the vehicle 1, to make a reservation for entrance of the vehicle 1 to a parking lot, and the like. The vehicle information server 20 can inform the navigation system of the in-vehicle equipment 10 of destination setting, change, or the like using push transmission as needed.

As the user terminal 40 of the outside-vehicle user 4, various terminals that are connectable to the communication network 5 can be used. The user terminal 40 may be a portable terminal, such as a general-purpose smartphone or a portable information terminal. The user terminal 40 may be a personal computer, a workstation, or a dedicated terminal for using a service of the information center 2. The user terminal 40 can be connected to the information center 2 using a web browser or a dedicated application. In regard to communication between the user terminal 40 and the information center 2, encrypted communication, such as secure socket layer (SSL), may be used. In the user terminal 40, the user ID is stored.

Command Transmission Flow 1

Hereinafter, a command transmission method from the vehicle information server 20 of the information center 2 to the in-vehicle equipment 10 of the vehicle 1 in the vehicle-oriented service providing system 100 will be described referring to the flowchart of FIG. 6. As described above, the in-vehicle equipment 10 is connected to the broker 3 that is made trustworthy from the vehicle information server 20.

After the ACC power of the vehicle 1 starts, the in-vehicle equipment 10 notifies the push information server 30 of the broker 3 of the vehicle ID of the host vehicle and the waiting state for push transmission (Step S101). When the vehicle ID and the waiting state are transmitted to the push information server 30, the in-vehicle equipment 10 is brought into the push waiting state (Step S102).

The push information server 30 of the broker 3 receives the vehicle ID from the in-vehicle equipment 10 (Step S103), and is brought into a push transmission waiting state in which push transmission is possible at any time (Step S104). The push information server 30 manages whether or not the vehicle 1 corresponding to each vehicle ID is in the push waiting state.

In this state, the push information server 30 can receive the command from the vehicle information server 20 of the information center 2 at any timing. The command is generated with an operation on the in-vehicle equipment 10 of the user who is an occupant of the vehicle 1, an inference in the vehicle information server 20 of the information center 2, an operation of the outside-vehicle user 4 on the user terminal 40, or the like as a trigger. In the flowchart of FIG. 6, processing with the vehicle information server 20 and the user terminal 40 as a starting point of command generation will be described.

In an example, the vehicle information server 20 requests for transmission of a message to the in-vehicle equipment 10 or control of the in-vehicle equipment 10 (Step S105a). The vehicle information server 20 may draw an inference from registered information under a predetermined condition and may generate a request for notification to the in-vehicle equipment 10 or control of the in-vehicle equipment 10. For example, a case where information that congestion occurs on a route to a destination is acquired when the user registers a schedule in the vehicle information server 20 is assumed. In this case, the vehicle information server 20 may generate a request for notifying the in-vehicle equipment 10 of a message that route change is to be performed. A case where a condition of a user's comfortable temperature, humidity, or the like is set in the vehicle information server 20 is assumed. In this case, where information that sudden weather fluctuation occurs on a route of the vehicle 1 during traveling is acquired, the vehicle information server 20 can generate a request to adjust setting of an air conditioner according to the user's comfortable temperature and humidity.

In another example, the outside-vehicle user 4 may select an action to be applied to the vehicle 1 using the user terminal 40 (Step S105b). For example, the outside-vehicle user 4 may input that a schedule of the user who drives the vehicle I is canceled using the user terminal 40 while another user is driving the vehicle 1. In such a case, the user terminal 40 can generate a request to inform the user of the change of the destination by voice.

When the request to the in-vehicle equipment 10 is generated through Step S105a or S105b, the vehicle information server 20 generates appropriate commands and encrypts the generated commands (Step S106). As described above, the commands may be generated with a plurality of commands as one transmission unit. For each command, the security level (Lv0, Lv1, Lv2, Lv3, or the like) is prescribed in advance. The vehicle information server 20 encrypts the command corresponding to the security level of each command. When a plurality of commands is collectively transmitted as one transmission unit, the vehicle information server 20 performs encryption corresponding to a command having the highest security level on the commands in one transmission unit.

As an example, the command is constituted as shown in FIG. 4. The security level of the command having the highest security level becomes the total security level. The security level of a command capable of being transmitted can be restricted for each information center 2. For example, the certain information center 2 may be set to be not transmittable a command having a security level higher than the second highest security level Lv2. In FIG. 4, the hash value and the payload after the reference time can be encrypted.

Next, the vehicle information server 20 requests the push information server 30 of the broker 3 in the push transmission waiting state for command transmission (Step S107). The vehicle information server 20 transmits the vehicle ID and the ID of the vehicle information server 20 along with the commands. The push information server 30 receives the transmission request (Step S108).

The push information server 30 refers to the state of the in-vehicle equipment 10 of the vehicle 1 having the received vehicle ID with reference to the third storage unit 31, and when the in-vehicle equipment 10 is in the push waiting state, transmits the commands in one transmission unit (Step S109). When the in-vehicle equipment 10 is in the push reception disable state, the push information server 30 may temporarily store the commands in the third storage unit 31 and may wait until the in-vehicle equipment 10 is brought into the push waiting state. When the in-vehicle equipment 10 is in the push reception disable state for a predetermined time or more, the push information server 30 may notify the vehicle information server 20 of failure in transmission due to overtime and may discard the commands.

The external linkage unit 17 of the in-vehicle equipment 10 receives the commands in one transmission unit through push transmission from the push information server 30 side (Step S110). After the reception of the commands, the external linkage unit 17 of the in-vehicle equipment 10 may be continued in the waiting state for the commands. Alternatively, the in-vehicle equipment 10 may end the waiting state for the commands once, then, may notify the push information server 30 of the vehicle ID and the waiting state again, and may be brought into the push waiting state.

The external linkage unit 17 of the in-vehicle equipment 10 decrypts the commands received from the push information server 30 (Step S111). Decryption is performed using the encryption key corresponding to the total security level.

The external linkage unit 17 of the in-vehicle equipment 10 determines security for each decrypted command (Step S112). Specifically, the external linkage unit 17 of the in-vehicle equipment 10 confirms that there is no error in the security level of each command. When there is an error in the security level, the external linkage unit 17 determines that the command is not executable. When a command having a security level higher than the total security level is included in the decrypted commands, the external linkage unit 17 determines that the command is not executable. Solely when encryption corresponding to a security level equal to or lower than the total security level is performed, the external linkage unit 17 of the in-vehicle equipment 10 determines that the command is executable. For example, when a command having the security level Lv3 generated in an unauthorized manner is received from the vehicle information server 20 that is not permitted to generate a command having a security level higher than the security level Lv2, the in-vehicle equipment 10 does not execute the command. In this way, it is possible to reduce a risk that an unauthorized command is received from the unauthorized vehicle information server 20 and the control device 13 is operated. Even though an unauthorized command is transmitted from another person who pretends to the push information server 30 to the external linkage unit 17 of the in-vehicle equipment 10 using any method, it is possible to secure safety unless as long as an encryption key corresponding to a command having a high security level is not known to another person.

A command determined to be executable in the external linkage unit 17 of the in-vehicle equipment 10 is executed in each function execution unit 18 of the in-vehicle equipment 10 (Step S113). For example, a command for notifying of destination change of the navigation system or a command for changing a destination of the navigation system is executed in the function execution unit 18 corresponding to the control device 13 of the navigation system. For example, a command for changing the temperature of the air conditioner is executed in the function execution unit 18 corresponding to the control device 13 of the air conditioner. Each function execution unit 18 can transmit control information to the corresponding control device 13, start the function, and make the control device 13 perform a needed operation.

When the driver of the vehicle 1 turns off an ACC power switch, the in-vehicle equipment 10 can receive an ACC-OFF signal (Step S114). The in-vehicle equipment 10 can be configured to receive the ACC-OFF signal from an ACC power supply device through the in-vehicle communication line 14. When the ACC-OFF signal is not received, the in-vehicle equipment 10 can be brought into the push waiting state of Step S102 again. In FIG. 6, for simplification, a branch from Step S114 to Step S102 will be omitted.

In Step S114, after the ACC-OFF signal is received, the external linkage unit 17 of the in-vehicle equipment 10 notifies the push information server 30 of the broker 3 of the vehicle ID and the end of push waiting (Step S115). When the notification of the end of push waiting is received from the in-vehicle equipment 10, the push information server 30 changes the state of the vehicle 1 to be managed in the third storage unit 31 to the push reception disable state, and ends the push transmission waiting state to the in-vehicle equipment 10 (Step S116).

Command Transmission Flow 2

Next, an example of processing with a user's operation on the in-vehicle equipment 10 as a trigger will be described referring to FIG. 7. In the example of FIG. 7, an occupant of the vehicle 1 installs an application related to an operation of the control device 13 on the function execution unit 18 from the vehicle information server 20 using the external information browsing unit 16 of the in-vehicle equipment 10. The flowchart of FIG. 7 basically corresponds to the portion of Steps S101 to S113 of FIG. 6.

Steps S201 to S204 are the same as Steps S101 to S104 of FIG. 6. When the push waiting unit 171 of the in-vehicle equipment 10 is in the push waiting state, the occupant of the vehicle 1 accesses the portal server 23 of the information center 2 and selects installation of an application in the vehicle information server 20 on the in-vehicle equipment 10 using the external information browsing unit 16 (Step S205). In this case, unlike a normal web site, the information center 2 does not transfer a file of the application directly to the request to install the application from the external information browsing unit 16.

When an application to be installed is selected on the portal server 23, generation and encryption of an inquiry request command are instructed from the portal server 23 to the vehicle information server 20 (Step S206). The "inquiry request" refers to the vehicle information server 20 requesting the in-vehicle equipment 10 to inquire the vehicle information server 20 about whether or not there is an application to be installed. Encryption is the same as in Step S106.

Next, the vehicle information server 20 requests the push information server 30 of the broker 3 in the push transmission waiting state to transmit the inquiry request command (Step S207). The push information server 30 receives the transmission request of the inquiry request command (Step S208).

The inquiry request command is push-transmitted to the in-vehicle equipment 10, and processing, such as decryption and security determination, is executed (Steps S209 to S212).

In Step S213, the function execution unit 18 that receives the inquiry request command from the external linkage unit 17 of the in-vehicle equipment 10 executes the inquiry request command. In this case, the function execution unit 18 executes a function of installing an application. The function execution unit 18 inquires the vehicle information server 20 of the information center 2 about whether or not there is an application to be installed (S213). The inquiry from the function execution unit 18 to the vehicle information server 20 may be performed directly without passing through the push information server 30. The vehicle information server 20 receives the inquiry (Step S214), and responds that there is an application to be installed (Step S215). The function execution unit 18 receives the response (Step S216). Thereafter, the application to be installed is downloaded (Step S217). The download of the application may be performed directly between the in-vehicle equipment 10 and the vehicle information server 20 through the communication network 5. The download of the application may be performed using a method, such as file transfer protocol (FTP).

The processing of Steps S213 to S217 corresponds to the processing of Steps S113 of FIG. 6. A flow of subsequent processing is the same as the processing after Step S114 of FIG. 6.

As described above, in the example shown in FIG. 7, an application can be installed on the function execution unit 18 without using the user interface of the external information browsing unit 16 (web browser) logically separated from other portions of the in-vehicle equipment 10.

The processing with the user's operation on the in-vehicle equipment 10 as a trigger is not limited to the processing described above. For example, when there is a plurality of users who drive the vehicle 1, each user can register setting of the seat suitable for the user in the vehicle information server 20. The setting of the seat includes setting of a front-rear position, a backrest inclination, a seat surface height, hardness of the seat, ventilation, a heater, and a massage function. The user who drives the vehicle 1 inputs information that the user is the driver from the in-vehicle equipment 10, thereby requesting the vehicle information server 20 to adjust the seat setting to setting suitable for the user. The vehicle information server 20 that receives the request push-transmits a command for adjusting the seat setting to the in-vehicle equipment 10 by way of the push information server 30.

The method that is disclosed in the specification described referring to FIGS. 6 and 7 can be executed by a processor included in one or more of the in-vehicle equipment 10, the vehicle information server 20, and the push information server 30 according to a program. Such a program can be stored in a non-transitory computer-readable medium. Examples of the non-transitory computer-readable medium include a hard disk, a RAM, a ROM, a flash memory, a CD-ROM, an optical storage device, a magnetic storage device, and the like, but are not limited thereto.

Effects

As described above, with the vehicle-oriented service providing system 100, the commands can be transmitted from the vehicle information server 20 of the information center 2 to the in-vehicle equipment 10 through solely the push information server 30 of the broker 3 with safety secured. The push information server 30 is provided, whereby the commands generated by the vehicle information server 20 can be transmitted to the vehicle 1 at any timing. With this, it is possible to perform an operation or the like to be applied to the control device 13 at a needed timing.

Since connection of the external linkage unit 17 of the in-vehicle equipment 10 is inhibited without depending on push transmission from the push information server 30, it is possible to increase safety for an operation of the control device 13 of the vehicle 1 from the outside other than the information center 2. In the vehicle information server 20, encryption is performed according to the security level of the command, a command encrypted with a security level equal to or lower than the security level of the command is not executed. With this, it is possible to set a security level according to the safety of the command or the significance of the control device 13 to be controlled by the command, and to secure security according to the command.

Since a plurality of commands can be collected in one transmission unit and transmitted between the vehicle information server 20 and the in-vehicle equipment 10, it is possible to transmit many commands simultaneously. When connection for push transmission is established between the push information server 30 and the in-vehicle equipment 10 once, since continuous push transmission is possible, asynchronous and frequent push transmission is possible. Accordingly, with the vehicle-oriented service providing system 100, frequent or enormous push transmission is possible.

When enormous data transmission occurs from the vehicle information server 20 to the in-vehicle equipment 10, as in the example shown in FIG. 7, a command for requesting for inquiry can be push-transmitted from the vehicle information server 20 to the in-vehicle equipment 10 by way of the push information server 30. With this, since it is possible to perform subsequent data transmission directly between the in-vehicle equipment 10 and the vehicle information server 20, it is possible to secure safety and efficiency.

Since the external information browsing unit 16 that browses information of the external server 6 is logically separated from the external linkage unit 17 that is linked with the control devices 13 inside the vehicle 1, the external linkage unit 17 is not affected by the external information browsing unit 16. That is, even though the user accesses malicious software on the Internet with the external information browsing unit 16, the outside of the external information browsing unit 16, such as the external linkage unit 17 and the function execution unit 18, is not affected. With this, since it is possible to freely browse information of the external server 6 in the external information browsing unit 16, and connection from the external server 6 to the external linkage unit 17 through the external information browsing unit 16 is protected, it is possible to maintain security to the control devices 13.

Since the content of the operation on the external information browsing unit 16 or the user terminal 40 of the outside-vehicle user 4 can be push-transmitted through the vehicle information server 20 with safety and efficiency, it is possible to operate the control devices 13 inside the vehicle 1 or from a remote location asynchronously while securing safety.

The disclosure is not limited to the above-described embodiment, and many modifications and alterations can be made. For example, the functions, the functional blocks, and the like included in the units, the steps, and the like can be rearranged as long as there is no logical contradiction, and a plurality of units, steps, or the like may be combined into a single unit or step or may be divided.

For example, the configuration of the servers included in the information center 2 is illustrative. The information center 2 may include servers other than the vehicle information server 20, the portal server 23, and the contract management server 24. The vehicle information server 20 may fetch the functions of one or both of the portal server 23 and the contract management server 24. The communication mechanism 22 may be embedded in the vehicle information server 20.

In FIG. 6, when the ACC power is off, the in-vehicle equipment 10 ends the processing. However, even though ACC is off, a part or all of the functions of the in-vehicle equipment 10 may be operated. When a part of the functions of the in-vehicle equipment 10 is operated, the outside-vehicle user 4 may operate the vehicle 1 using the user terminal 40. For example, the outside-vehicle user 4 confirms whether or not the vehicle 1 is locked from the user terminal 40, and when the vehicle 1 is not locked, can perform an operation to lock the vehicle 1. The outside-vehicle user 4 can set a destination of the navigation system from the user terminal 40 in advance while the vehicle 1 is stopped.

What is claimed is:

1. A vehicle-oriented service providing system comprising:
   an in-vehicle device mounted in a vehicle and configured to transmit a waiting state to a push information server and receive commands that are applied to a control device inside the vehicle;
   a vehicle information server configured to transmit the commands to the in-vehicle device; and
   the push information server configured to mediate the transmission of the commands from the vehicle information server to the in-vehicle device,
   wherein the in-vehicle device, the vehicle information server, and the push information server are connected to a communication network,
   wherein, in the commands, a security level prescribed in advance for each of the commands is set,
   wherein the vehicle information server is configured to perform encryption corresponding to the security level on the commands and request the push information server for transmission of the encrypted commands,
   wherein the push information server is configured to:
      receive the commands from the vehicle information server,
      when the waiting state of the vehicle is a push reception disable state, store the commands and wait until the vehicle is brought into a push waiting state, and
      when the waiting state of the vehicle is a push reception disable state and the vehicle is not brought into the push waiting state after a predetermined time has elapsed, notify the vehicle information server of transmission failure due to overtime and discard the commands, and
      when the waiting state of the vehicle is a push waiting state, transmit the commands to the vehicle, and
   wherein the in-vehicle device is configured to:
      wait for commands from the push information server so as to receive the encrypted commands solely from the push information server,
      receive the encrypted commands from the vehicle information server by way of the push information server,
      decrypt the received encrypted commands, and
      solely when encryption corresponding to a security level equal to or higher than the security level set in advance in the commands is performed, execute the commands.

2. The vehicle-oriented service providing system according to claim 1, wherein the vehicle information server is configured to generate the commands based on a predetermined condition without receiving a request from the in-vehicle device and transmit the commands to the in-vehicle device.

3. The vehicle-oriented service providing system according to claim 1, wherein the in-vehicle device includes:
   a first processor configured to perform the reception, the decryption, and the execution of the commands; and
   a second processor configured to perform solely communication that is not applied to the control device inside the vehicle with the vehicle information server or another server.

4. The vehicle-oriented service providing system according to claim 1, wherein the security level is divided into two or more levels.

5. The vehicle-oriented service providing system according to claim 1, wherein:
   the in-vehicle device is configured to transmit a request that is applied to the control device inside the vehicle to the vehicle information server; and
   the vehicle information server is configured to, when the request is received from the in-vehicle device, transmit the command corresponding to the request to the in-vehicle device.

6. The vehicle-oriented service providing system according to claim 1, further comprising a portable terminal configured to transmit a request that is applied to the control device inside the vehicle to the vehicle information server, wherein the vehicle information server is configured to, when the request is received from the in-vehicle device, transmit the command corresponding to the request to the in-vehicle device.

7. The vehicle-oriented service providing system according to claim 1, wherein the vehicle information server is configured to:

transmit a plurality of the commands as one transmission unit to the in-vehicle device; and perform encryption corresponding to a security level of a command having a highest security level among the commands included in the transmission unit on the transmission unit.

8. A command transmission method that, in a vehicle-oriented service providing system including an in-vehicle device, a vehicle information server, and a push information server connected to a communication network, performs command transmission from the vehicle information server to the in-vehicle device, the command transmission method comprising:

with the in-vehicle device, transmitting a waiting state to the push information server and waiting for reception of commands that are applied to a control device inside a vehicle from the push information server;

with the vehicle information server, performing encryption corresponding to a security level prescribed in advance for each of the commands on the commands to be transmitted and requesting the push information server for transmission of the encrypted commands;

with the push information server, receiving the waiting state from the in-vehicle device, when the waiting state of the in-vehicle device is a push reception disable state, storing the encrypted commands, and when the waiting state of the vehicle is a push reception disable state and the vehicle is not brought into the push waiting state after a predetermined time has elapsed, notifying the vehicle information server of transmission failure due to overtime and discarding the commands, and when the waiting state of the vehicle is a push waiting state, transmitting the encrypted commands to the in-vehicle device; and with the in-vehicle device, decrypting the received encrypted commands, and solely when encryption corresponding to a security level equal to or higher than the security level set in advance in the commands is performed, executing the commands.

* * * * *